United States Patent [19]

Kashiwagi

[11] Patent Number: 4,713,589
[45] Date of Patent: Dec. 15, 1987

[54] APPARATUS FOR LINEARITY CORRECTION ON HORIZONTAL DEFLECTION

[75] Inventor: Shigeru Kashiwagi, Iwai, Japan

[73] Assignee: Victor Company of Japan, Ltd., Japan

[21] Appl. No.: 897,981

[22] Filed: Aug. 19, 1986

[30] Foreign Application Priority Data

Aug. 20, 1985 [JP] Japan .................................. 60-182575

[51] Int. Cl.[4] ........................ H01J 29/70; H01J 29/76; H01F 21/00; H01H 1/00
[52] U.S. Cl. ..................................... 315/400; 336/110; 335/213
[58] Field of Search ................ 315/400, 399; 336/110; 335/213, 229, 227

[56] References Cited

U.S. PATENT DOCUMENTS 3,555,350  1/1971  Okuda ............................... 315/400
3,571,606  3/1971  Kikuchi ............................. 315/400

FOREIGN PATENT DOCUMENTS 1693369  3/1964  Japan ................................. 315/400

Primary Examiner—Theodore M. Blum
Assistant Examiner—Gregory C. Issing
Attorney, Agent, or Firm—Lowe, Price, LeBlanc, Becker & Shur

[57] ABSTRACT

A sawtooth current fed to a cathode ray tube horizontal deflection coil is linearized with a structure including first and second saturable cores respectively coupled to the north and south pole sides of a single permanent magnet. The permanent magnet is interposed between the cores so that a magnetic flux caused by the permanent magnet passes through the first and second saturable cores in series. First and second windings, respectively wound on the first and second saturable cores and connected in series with each other, are arranged such that, when a current flows through them in one direction, a magnetic flux induced by the first winding in the first core is added to the magnetic flux coupled by the permanent magnet in the first saturable core and the magnetic flux coupled by the permanent magnet to the second core is subtracted from magnetic flux induced by the second winding in the second core.

9 Claims, 7 Drawing Figures

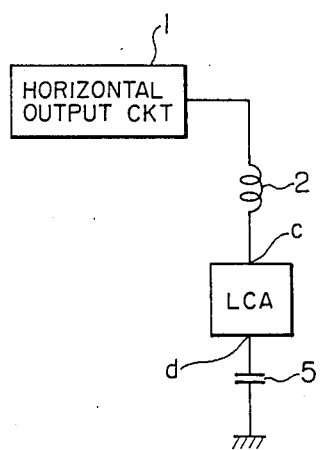
FIG. 1
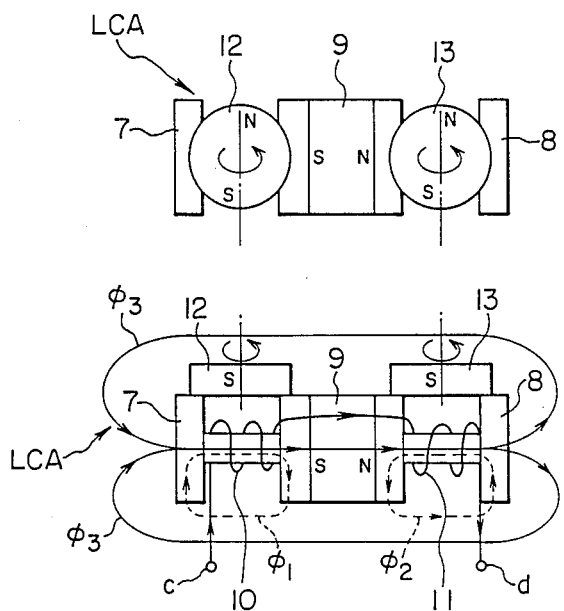
FIG. 2A
FIG. 2B
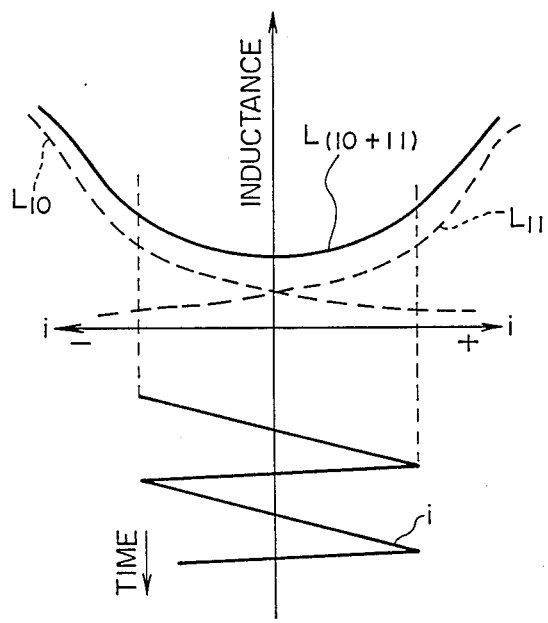
FIG. 3
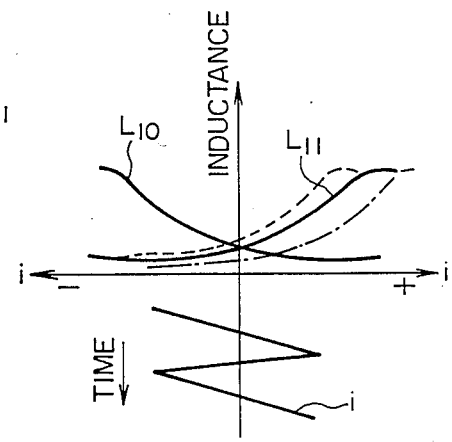
FIG. 4

APPARATUS FOR LINEARITY CORRECTION ON HORIZONTAL DEFLECTION

BACKGROUND OF THE INVENTION

The present invention relates generally to the correction of horizontal deflection linearity for picture tubes or cathode ray tubes, and more particularly to an apparatus for processing the waveform of a sawtooth current fed to a horizontal deflection coil in order to improve the linearity of horizontal deflection on a screen of a picture tube.

An important problem in a picture tube provided with a screen having a greater radius of curvature than that of the locus of electron beams relates to the correction of the linearity of the horizontal deflection. The distance from the deflection center to the screen becomes greater at the screen edges than at the center of the screen and therefore the per-unit-time travelling distance of the electron beam on the screen increases progressively from the center of the screen toward the edges thereof, resulting in the occurrence of picture distortion at the edge portions thereof.

In order to avoid this problem it is known that a capacitor, blocking dc components, is connected in series to a horizontal deflection coil to which a ramp current is fed from a horizontal deflection output circuit so that the waveform of the ramp current is processed to have a S-configuration with resonance action caused by the capacitor and the horizontal deflection coil. However, one of problems with such an arrangement is that it is impossible to effect the correction with respect to the fact that the left edge portions of the screen is different from the right edge portion thereof in linearity because of the variations in the characteristic of the horizontal deflection coil and that different distortions occur at the right and left edge portions thereof due to the application of an exponential component to the ramp current. Furthermore, when there is a need to operate a picture tube with a variable horizontal deflection frequency to make it compatible with different scanning systems, a switching device will be required for selecting one from a plurality of capacitors in accordance with the change of the horizontal defletion frequency. However, with such a prior art technique, it is required to perform the switching operation with a power supply being cut off in order to prevent an electric arc from occuring at the contacts of the switching device, resulting in complex switching operation.

SUMMARY OF THE INVENTION

The present invention has been developed in order to overcome the disadvantages inherent in the prior art arrangements.

It is therefore an object of the present invention to provide a new and improved apparatus for correcting the linearity of horizontal deflection on a screen of a picture tube which is capable of processing the waveform of a ramp current fed to a horizontal deflection coil so that the horizontal linearity is corrected irrespective of the variations in horizontal deflection frequency.

Another object of the present invention is to provide an apparatus for correcting the linearity of horizontal deflection which is capable of freely adjusting the linearity independently with respect to the right and left side of a screen.

The linearity correction apparatus according to the present invention comprises first and second saturable cores respectively coupled to the north and south pole sides of a permanent magnet with the permanent magnet being interposed therebetween so that a magnentic flux caused by the permanent magnet circulates to pass through the first and second saturable cores in series. Further included are first and second windings respectively wound around the first and second saturable cores and coupled to a horizontal deflection coil of a horizontal deflection circuit. The first and second windings are connected in series to each other and arranged such that, when a current flows therethrough in a direction, a magnetic flux caused by the first winding is added to the magnetic flux generated by the permanent magnet with respect to the first saturable core and the magnetic flux generated by the permanent magnet is subtracted by a magnetic flux caused by the second winding with respect to the second saturable core.

Preferably, the linearity correction apparatus further comprises first and second auxiliary magnets which are respectively provided with respect to the first and second saturable cores. The first and second auxiliary magnets are respectively rotatable and each of them has a function to adjust the amount of the magnetic flux passing through each of the first and second saturable cores in accordance with the rotated position thereof.

BRIEF DESCRIPTION OF THE DRAWINGS

The object and features of the present invention will become more readily apparent from the following detailed description of the preferred embodiments taken in conjunction with the accompanying drawings in which:

FIG. 1 is a schematic block diagram of a horizontal deflection linearity correction apparatus according to the present invention incorporated in a horizontal deflection circuit;

FIG. 2A is a top plan view of the linearity correction apparatus shown in FIG. 1;

FIG. 2B is a side elevational view of the linearity correction apparatus shown in FIG. 1;

FIG. 3 is a graphic illustration useful for describing the variations in the inductance of each of the windings occuring in response to the variations in the magnitude and polarity of a current flowing therethrough;

FIG. 4 is a graphic illustration describing the variations in inductance when an auxiliary magnet is used;

DETAILED DESCRIPTION OF THE INVENTION

Figure 5:
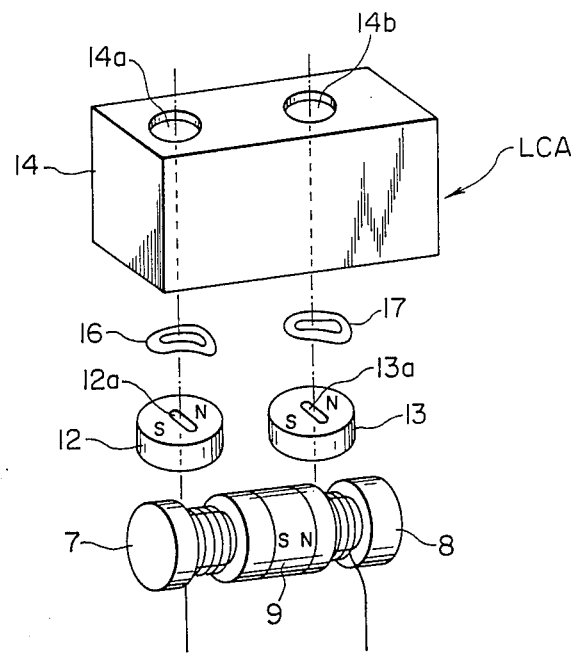
FIG. 5 is an exploded view of the linearity correction apparatus according to the present invention.

Referring now to FIG. 1, there is schematically illustrated a horizontal deflection circuit with a linearity correction device LCA according to the present invention. The horizontal deflection circuit comprises a horizontal-output citcuit 1 whose function is to generate a sawtooth current which in turn flow through a horizontal deflection coil 2. The horizontal deflection coil 2 is connected to one terminal c of the linearity correction device LCA and the other terminal d thereof is coupled to a capacitor 5 for blocking a direct-current component. The capacitor 5 is arranged to have a large capacitance value in order to make it's impedance sufficiently small with respect to the frequency of a horizontal deflection current to be fed to the horizontal deflection coil 2. This means that the process of the waveform of the horizontal deflection current for the correction of lineariry is performed by the horizontal deflection lineariry correction device LCA unlike the above-described conventional technique that it is achieved on the basis of the resonance action caused by the capacitor and the horizontal deflection coil.

FIGS. 2A and 2B illustrate the linearity correction device LCA, with FIG. 2A being a top plan view and FIG. 2B being a side elevational view. The linearity correction device LCA includes first and second drum cores 7, 8 made of a ferromagmetic material having saturable magnetic characteristic such as ferrite and having first and second series connected windings 10, 11 therearound. A permanent magnet 9 is provided between the first and second drum cores 7, 8. The drum cores have aligned axes, so that the magnetic flux generated by the permanent magnet 9 circulates to pass through the first and second drum cores 7, 8 in series. In the figure, the south pole (S-pole) of the permanent magnet 9 is attached to the first drum core 7 and the north pole (N-pole) is attached to the second drum core 8. Terminals c and d of the first and second windings 10, 11 respectively correspond to the terminals c and d shown in FIG. 1.

Series windings 10, 11 coupled in are wound around the first and second drum cores 7, 8 so that, when a current flows therethrough in a direction (in the figure, from the terminal c to the terminal d), a magnetic flux $\phi 1$ caused by the first winding 10 is added to a magnetic flux $\phi 3$ set up by the permanent magnet 9 with respect to the first drum core 7 and the magnetic flux $\phi 3$ is subtracted from a magnetic flux $\phi 2$ caused by the second winding 11 with respect to the second drum core 8. If the current flows therethrough in the reverse direction, the magnetic flux $\phi 3$ is subtracted from the magnetic flux $\phi 1$ in the first drum core 7 and the magnetic flux $\phi 2$ is added to a magnetic flux $\phi 3$ in the second drum core 8. It should be noted that the arrangement of the windings 10, 11 disallows the magnetic flux $\phi 1$ generated by a current i flowing through the first winding 10 to pass through the second drum core 8 and the magnetic flux $\phi 2$ generated by the current i flowing through the second winding 11 to pass through the first drum core 7.

FIG. 3 is a graphic illustration useful for describing the variations in the inductance L10 of the winding 10 and in the inductance L11 of the winding 11 occuring in response to the variations in the magnitude and polarity of the cuurrent i flowing therethrough.

When the current i flowing through the winding 10 is positive, the inductance L10 of the winding 10 wound around the drum core 7 decreases in accordance with the increase in the current i due to saturation of the drum core 7. When the current i is negative, the inductance L10 thereof increases as the current i increases because of reduction in the flux density in the drum core 7. On the other hand, the inductance L11 of the winding 11 wound around the drum core 11 decreases in accordance with the increase in the current i when the current i is negative, and the inductance L11 thereof increases as the current i increases when the current i is positive. Therefore, the resultant inductance L(10+11), i.e., the inductance between the terminals c and d, as illustrated in FIG. 3, becomes a minimum value when the current i assumes zero and increases as the current i varies in positive or negative direction, that is, as the absolute value of the current i increases.

When a sawtooth current i as shown in the lower portion of FIG. 3 flows through the linearity correction device LCA, the inductance between the terminals c and d varies so as to assume a maximum value in response to the positive or negative peak value of the sawtooth current i and to assume a minimum value with the current i being zero. As a result, the waveform of a sawtooth current supplied to the horizontal deflection coil 2 is processed to distort the edge portions thereof, that is, to have an S-configuration. This prevents picture distortion as described above.

Figure 6:
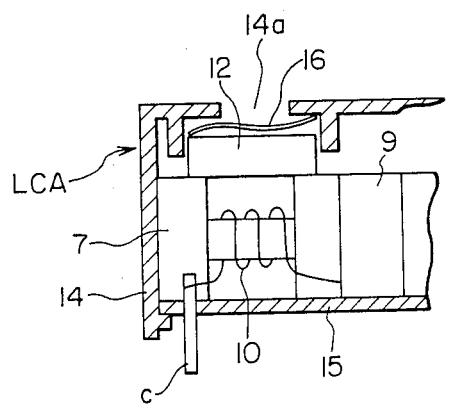
FIG. 6 is a partially sectional view of the linearity correction apparatus according to the present invention.

The linearity correction device LCA according to the present invention further includes first and second auxiliary magnets 12, 13 which are respectively provided in the vicinity of the first and second drum cores 7, 8. The linearity correction device LCA is encased in a non-metallic housing 14, as shown in FIGS. 5 and 6. The first and second drum cores 7, 8 are positioned on the bottom plate 15 of the housing 14 and the first and second auxiliary magnets 12, 13 are respectively biased against the drum cores 7, 8 by means of springs 16, 17 which are placed between the top plate of the housing 14 and the drum cores 7, 8. The top plate of the housing 14 has a pair of holes 14a and 14b which are aligned with the auxiliary magnets 12, 13 respectively. The auxiliary magnets 12, 13 respectively have grooves 12a, 13a so that they can be rotated by a driver inserted through the holes 14a, 14b and the springs 16, 17.

The auxiliary magnets 12, 13 influence the magnetic flux flowing through the drum cores 7, 8, unless the auxiliary magnets are rotated such that a line passing through the north and south poles thereof is perpendicular to the direction of a line passing through the north and south poles of the permanent magnet 9. Namely, in accordance with the rotated positions of the auxiliary magnets 12, 13, the magnetic flux generated by the permanent magnet 9 is increased or reduced by magnetic flux caused by the auxiliary magnet 12 or 13 in that degree.

Accordingly, the inductance values of the windings 10, 11 obtained when a current flows therethrough varies in accordance with the rotations of the auxiliary magnets 12, 13. FIG. 4 shows the variations of the inductance L11 when the auxiliary magnet 13 is rotated with the auxiliary magnet 12 being positioned such that the direction passing through the north and south poles thereof is perpendicular to the direction passing through the north and south poles of the permanent magnet 9. When the auxiliary magnet 13 is rotated such that the inductance L11 varies as indicated by a dotted line, a picture at the right side of a screen is contracted due to a high increasing rate of the inductance in the case that an electron beam moves from the left edge of the screen toward the right edge thereof. On the other hand, when the auxiliary magnet 13 is rotated such that the inductance L11 varies as indicated by a chain line, the picture at the right side of a screen is stretched due to reduction in the inductance increasing rate. Thus, it is possible to easily optionally correct the horizontal linearity at the right side of the screen by the rotating the auxiliary manget 13. It is also possible to easily optionally correct the horizontal linearity at left side thereof by the rotating auxiliary magnet 12.

It should be understood that the foregoing relates to only a preferred embodiment of the present invention, and that it is intended to cover all changes and modifications of the embodiment of the invention herein used for the purposes of the disclosure, which do not constitute departures from the spirit and scope of the invention.

What is claimed is:

1. An apparatus for processing the waveform of a sawtooth current fed to a horizontal deflection coil to correct a horizontal deflection linearity on a screen of a picture tube, comprising:

a single permanent magnet;

first and second saturable cores respectively coupled to north and south pole sides of said single permanent magnet with said single permanent magnet being coaxially interposed therebetween in substantially contact relation to each other so that a magnetic flux caused by said single permanent magnet circulates to pass through said first and second saturable cores in series; and first and second windings respectively wound around said first and second saturable cores in directions opposite to each other, connected in series to each other, and connected to said horizontal deflection coil, said first and second windings being arranged such that, when a current flows therethrough in a direction, a magnetic flux caused by said first winding is added to the magnetic flux generated by said single permanent magnet with respect to said first saturable core and the magnetic flux generated by said single permanent magnet is subtracted by a magnetic flux caused by said second winding with respect to said second saturable core.

2. An apparatus as claimed in claim 1, further comprising first and second auxiliary magnets respectively provided in the vicinity of said first and second saturable cores for adjusting the amount of the magnetic flux generated by said permanent magnet.

3. An apparatus as claimed in claim 2, wherein each of said first and second auxiliary magnets has a cylindrical configuration and is respectively rotatable about the axis thereof.

4. An apparatus as claimed in claim 3, wherein each of said first and second auxiliary magnets is positioned with respect to each of said first and second saturable cores so as to adjust the amount of the magnetic flux passing through each of said first and second saturable cores by rotating each of said first and second auxiliary magnets.

5. A horizontal deflection device for a cathode ray tube comprising means for deriving a sawtooth current having zero average value, a horizontal deflection coil for the tube, a series circuit including the means for deriving, the horizontal deflection coil for the tube and a linearity correction device, the linearity correction device including: first and second saturable magnetic cores having aligned segments on which are respectively wound first and second coils series connects with each other and the horizontal deflection coil, means for supplying DC magnetic flux to said cores, said first and second coils, said cores and said flux supplying means being arranged so that (a) the same DC magnetic fluxes are in the first and second cores, (b) fluxes induced in said cores by the current flowing in the coils are isolated from each other and the DC magnetic fluxes in the first and second cores are respectively additive with and subtractive from magnetic fluxes induced in the cores when the sawtooth current has a first polarity and the permanent magnet fluxes in the first and second cores are respectively subtractive from and additive with magnetic fluxes induced in the cores when the sawtooth current has a second polarity, said permanent magnet means including a single permanent magnet having opposite polarity first and second pole faces at opposite ends thereof in alignment with the elongated segments, a first low reluctance path extending between the first pole face and the elongated segment of the first core, and a second low reluctance path extending between the second pole face and the elongated segment of the second core.

6. A horizontal deflection device for a cathode ray tube comprising means for deriving a sawtooth current having zero average value, a horizontal deflection coil for the tube, a series circuit including the means for deriving, the horizontal deflection coil for the tube and a linearity correction device, the linearity correction device including: first and second saturable magnetic cores having aligned elongated segments on which are respectively wound first and second coils series connected with each other and the horizontal deflection coil, permanent magnet means for magnetizing said cores, said first and second coils, said cores and said permanent magnet means being arranged so that (a) the same permanent magnet fluxes are in the first and second cores, (b) fluxes induced in said cores by the current flowing in the coils are isolated from each other and the permanent magnet fluxes in the first and second cores are respectively additive with and subtractive from magnetic fluxes induced in the cores when the sawtooth current has a first polarity and the permanent magnet fluxes in the first and second cores are respectively subtractive from and additive with magnetic fluxes induced in the cores when the sawtooth current has a second polarity, said permanent magnet means including a single permanent magnet having opposite polarity first and second pole faces at opposite ends thereof in alignment with the elongated segments, a first low reluctance path extending between the first pole face and the elongated segment of the first core, and a second low reluctance path extending between the second pole face and the elongated segment of the second core.

7. The horizontal deflection device of claim 6, further including means for individually adjusting the magnetic fluxes in said first and second cores.

8. The horizontal deflection device of claim 7, wherein each of said flux adjusting means includes a disc-shaped permanent magnet having opposite polarity circumferential portions, each disc-shaped permanent magnet being rotatable about an axis at right angles to the alignment direction of the elongated segments, a third low reluctance path from opposite ends of the elongated segment of the first core radially across the disc-shaped permanent magnet for adjusting the flux of the first core, and a fourth low reluctance path from opposite ends of the elongated segment of the second core radially across the disc-shaped permanent magnet for adjusting the flux of the second core.

9. The horizontal deflection device of claim 8, wherein the first and third low reluctance paths and the elongated segment of the first core are included in a first drum core, the second and fourth low reluctance paths and the elongated segment of the second core are included in a second drum core, the first and second drum cores including radially extending segments having edges respectively contacting circumferential portions of the disc-shaped permanent magnets for adjusting the magnetic fluxes of the first and second cores.

* * * * *